UNITED STATES PATENT OFFICE.

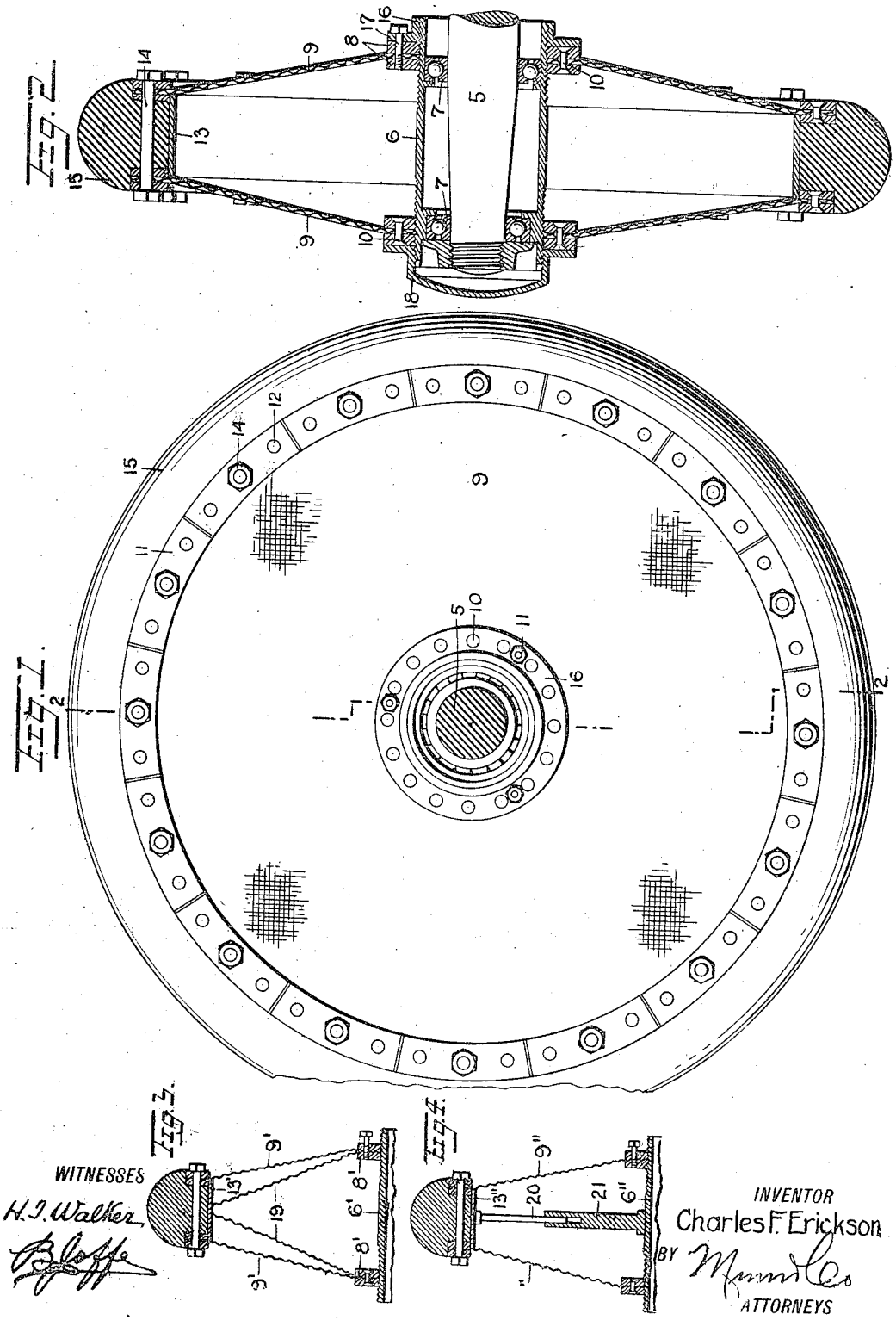

CHARLES F. ERICKSON, OF NEW YORK, N. Y.

VEHICLE-WHEEL.

1,172,123.

Specification of Letters Patent.  Patented Feb. 15, 1916.

Application filed February 12, 1915. Serial No. 7,688.

*To all whom it may concern:*

Be it known that I, CHARLES F. ERICKSON, a subject of the King of Sweden, and a resident of the city of New York, borough of Brooklyn, in the county of Kings and State of New York, have invented a new and Improved Vehicle-Wheel, of which the following is a full, clear, and exact description.

My invention relates to vehicle wheels and has reference more particularly to the resilient, non-pneumatic class of wheels.

The object of the invention is to provide a simple, strong and inexpensive vehicle wheel which is characterized by a resilient rim connected to the hub by diaphragms of pliable or substantially inelastic material.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a side elevation of a wheel embodying my invention; Fig. 2 is a vertical section on line 2—2, Fig. 1; Fig. 3 is a fragmentary vertical section through a modified structure of my wheel; and Fig. 4 is a section similar to that shown in Fig. 3 of a further modification of my wheel.

Referring to the drawings, 5 is the axle on which the hub 6 is mounted to journal. Interposed between the axle and the hub are ball bearings 7 of any suitable construction. The hub 6 is threaded exteriorly at both ends, each threaded end being engaged by a pair of clamping flanges 8. The facing surfaces of the clamping flanges 8 are sinuous, as best illustrated in Figs. 3 and 4, to give a better bearing for the inner margin of diaphragms 9 made of pliable material. The diaphragms are connected to the corresponding clamping or binding flanges by rivets 10 which bind the pair of co-acting flanges together.

The pliable diaphragms 9 are preferably of treated canvas, but may be of woven metallic fabric, cable, chain, or of any other pliable nature. The diaphragm may be a unitary one or formed of radial sections connected to each other or free, in which case the diaphragm is a sectional one. The outer margin of the diaphragm 9 is engaged by a pair of clamping rings each formed of segments 11, the surface of the segments contacting with the diaphragm being corrugated and matched with the corresponding corrugated surfaces of the coöperating segments of the other ring so that a better gripping between the segments of the rings and the diaphragm is obtained. The coöperating segments of the two rings are connected to each other and to the diaphragm by rivets 12 or any other suitable connecting means.

Engaging the inner edge of the segments 11 of the inner rings is a resilient rim 13 made of strong steel, the width and thickness of which varies in accordance with the load for which the wheel is designed. The engagement of the rim 13 with the inner segments 11 is maintained by bolts 14 which engage the oppositely located pairs of segments 11 provided on the facing diaphragms 9. The bolt 14 is also made to pass through a rubber shoe 15 which is preferably recessed at the side thereof to accommodate the segments 11 forming the clamping rings, the shoulders formed by the recess bearing on the outer edges of the segments 11. The portion of the shoe between the segments is extended to bear on the rim, so as to eliminate cutting of the shoe at the shoulders by the segments 11. The diameter of the rim 13 is such that when the clamping flanges 8 are near the central part of the hub the said rim can be easily engaged with the inner edges of the segments 11. By moving the clamping flanges 8 toward the ends of the hub, the tension of the pliable diaphragms 9 can be increased. The inner end of the hub adjacent the clamping flanges 8 is provided with a lock nut 16 for locking the flanges on the hub at the rear end thereof. For further protection, locking screws 17 are provided for binding the lock nut to the flanges 8. The clamping flanges 8 at the front end of the hub are locked on the hub by a cap 18, which cap covers the nut for retaining the hub on the bearing of the axle 5. One end of the hub has a right thread, while the other has a left thread; so that when the hub 6 is turned relative to the flanges the same are caused to move simultaneously toward each other, or apart, and thereby the tension on the diaphragms 9 is varied.

The clamping rings being formed of segments permit the resilient rim 13 to give or yield when necessary under shocks or change of load, and thus relieve the axle from excessive shocks, and, consequently, the vehicle carried by the axle. The segmentary structure of the clamping rings which engage the resilient rim makes the wheel more flexible and, consequently, helps to absorb shocks received by the wheel during the use of same.

In the modified structure shown in Fig. 3, the wheel, in addition to the diaphragm 9', is provided with inner diaphragms 19. The inner marginal flange of the inner diaphragm 19 is secured to the clamping flanges 8' which engage the inner marginal flange of the diaphragms 9'. The peripheral edge of the diaphragms 19 is secured to the resilient rim 13', preferably midway between its ends, by any suitable means. The tension of the diaphragms 9' and 19 is controlled by the displacement of the hub 6', as previously described. The additional inner diaphragms 19 are used when the wheel is intended for heavy loads, such as truck wheels.

In Fig. 4 a further modification of the wheel is shown. In this structure, in addition to the diaphragms 9'', the resilient rim 13'' is provided in the central plane with radially directed projections 20. Engaging the ends of the projections 20 is a channeled flange 21 carried by the hub 6''. This flange 21 will prevent lateral displacement between the hub and the rim, but will permit relative displacement of the rim to the hub in the plane of the wheel, which is necessary for varying the tension of the diaphragms.

From the foregoing description, taken in connection with the accompanying drawings, the advantage of the construction and operation of the wheel shown will be readily understood by those skilled in the art to which the invention pertains; and while I have described the principle of operation, together with the wheel which I now consider to be the best embodiment thereof, I desire to have it understood that the wheel shown is merely illustrative and that such changes may be made as are within the scope of the appended claims.

Having thus described my invention, I claim as new and desire to secure by Letters Patent:

1. In a vehicle wheel, a hub having a right and left thread, a resilient rim, a diaphragm of pliable material on each side of the wheel, rings formed of segments carried by each of said diaphragms and engaging said rim, a shoe associated with said rings and rim, and clamping flanges carried by each of said diaphragms and threaded on said hub, substantially as and for the purpose set forth.

2. In a vehicle wheel, a hub having a right and a left thread, a resilient rim, a diaphragm of pliable material on each side of the wheel having a central opening, rings formed of segments engaging each diaphragm at the outer margin thereof, means connecting the opposite segments of the rings, whereby the segments of the rings are maintained in engagement with the rim, flanges in threaded engagement with the right and left threads of the hub, said flanges engaging a corresponding diaphragm at the central opening, means for locking the flanges to the hub, and a shoe associated with the rim and rings and engaged by the means connecting the segments of the rings.

3. In a vehicle wheel, a hub having a right thread on the outer surface at one end thereof and a left thread at the outer surface of the other end, a resilient rim, a diaphragm of pliable material on each side of the wheel having a central opening, each end of the hub being adapted to project through the central opening of a corresponding diaphragm, rings formed of segments engaging each diaphragm on each side thereof at the outer margin of said diaphragm, means connecting the opposite segments of the two diaphragms whereby the segments of the inner rings are maintained in engagement with the rim, pairs of flanges clamping the two sides of each diaphragm at the central opening and in threaded engagement with the threaded end projecting through the central opening of the diaphragm, means for locking the flanges to the hub, and a shoe associated with the rings and rim and engaged by the means connecting the segments of the rings of the two diaphragms.

4. In a vehicle wheel, a hub having a right thread at one end thereof and a left thread at the other end, a rim, a diaphragm of treated duck on each side of the wheel having a central opening, said hub having the ends thereof projecting through the central opening of the corresponding diaphragm, rings formed of segments engaging each diaphragm on each side thereof adjacent the outer margin of said diaphragm, the segments on the inner surface of the diaphragms adapted to engage with their inner edge the outer surface of the rim, bolts connecting the segments of the rings of the two diaphragms whereby the inner segments of the rings are maintained in engagement with the rim, a shoe engageing the rim and having annular recesses at each side thereof, the segments of the rings being located within said annular recesses of the shoe, the bolts connecting the segments of the rings of the two diaphragms engaging said shoe, a pair of clamping flanges engaging each diaphragm at the central opening, said flanges being in threaded engagement with the corresponding end of the hub projecting through the central opening of the diaphragm, and means for locking said clamping flanges to the hub.

In testimony whereof I have signed my name to this specification in the presence of two subscribing witnesses.

CHARLES F. ERICKSON.

Witnesses:
BLUECHER JOFFE,
PHILIP D. ROLLHAUS.